United States Patent Office 2,978,080
Patented Apr. 4, 1961

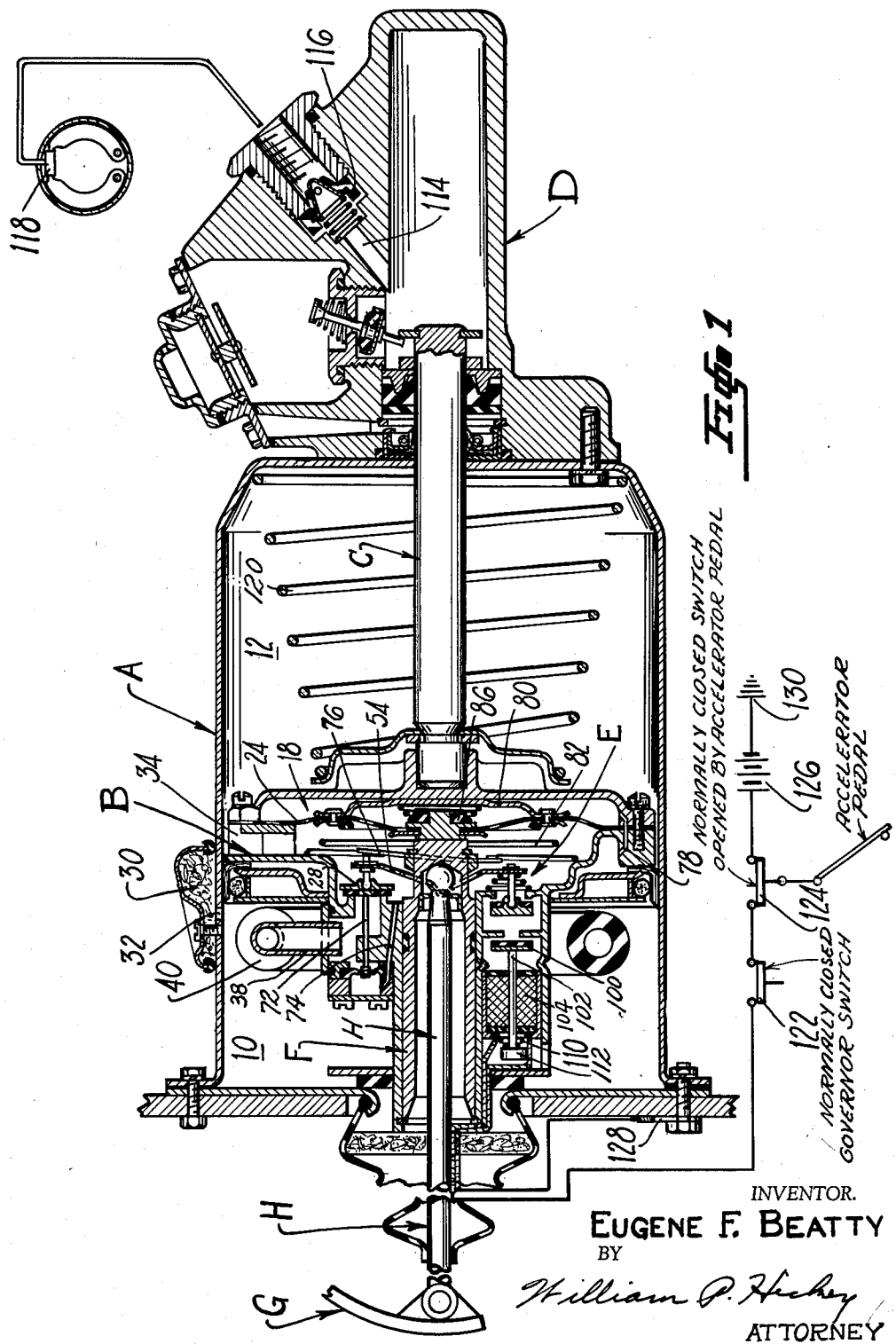

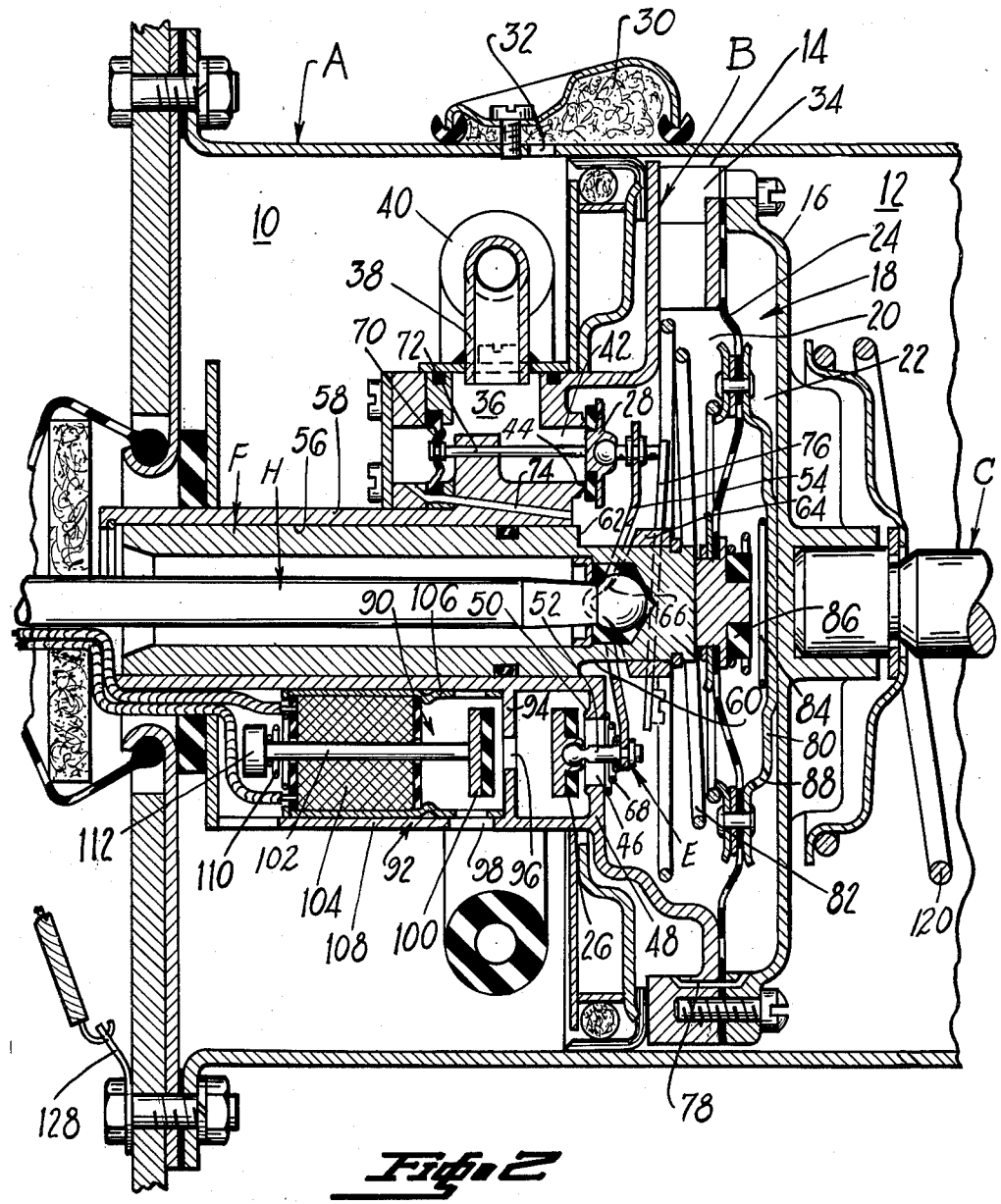

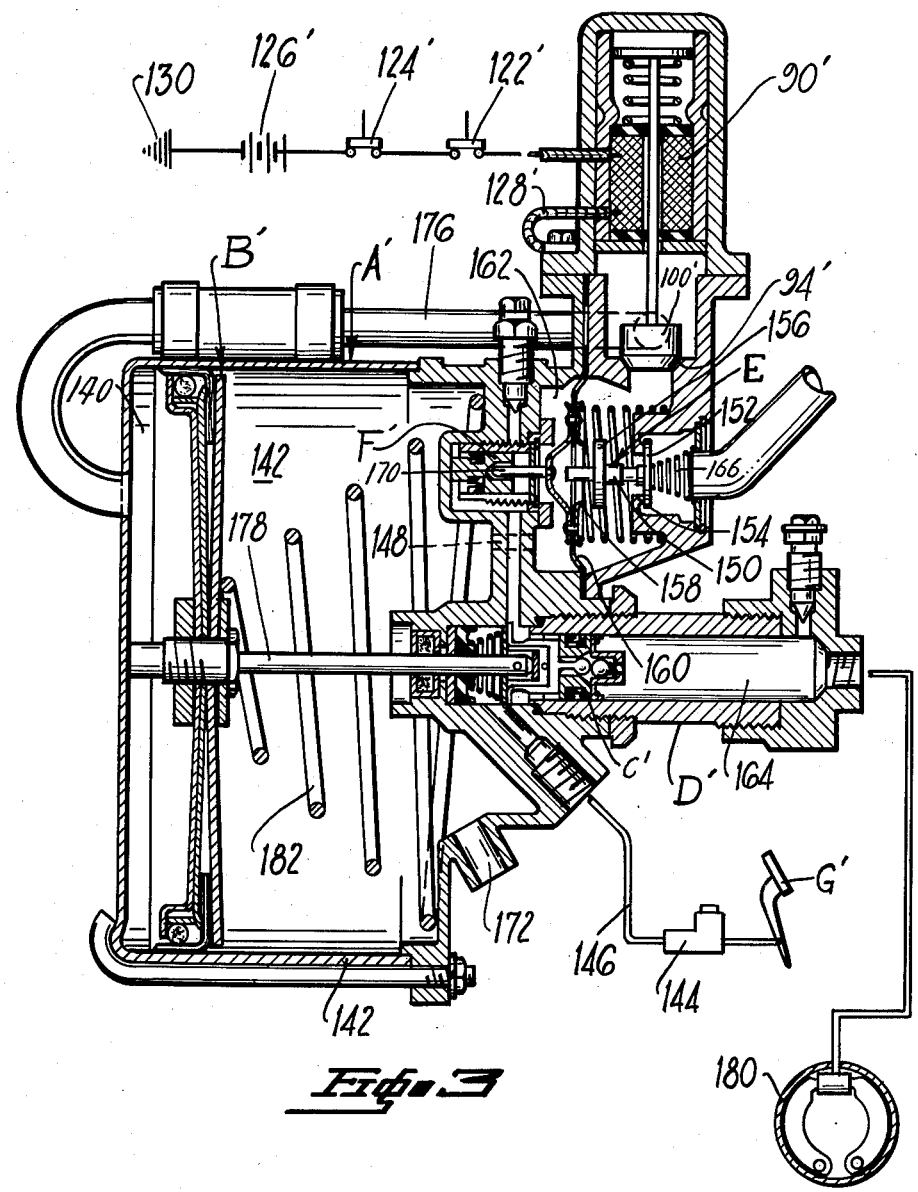

2,978,080

POWER BRAKE WITH AUTOMATIC HOLD FEATURE

Eugene F. Beatty, South Bend, Ind., assignor to The Bendix Corporation, a corporation of Delaware Filed Nov. 7, 1957, Ser. No. 695,094

8 Claims. (Cl. 192—3)

The present invention relates to fluid pressure servo-motors generally; and more particularly to the type of pneumatically powered master cylinders used in automotive hydraulic braking systems.

An object of the present invention is the provision of a new and improved fluid pressure servo-motor having normal control valve means for operating the servo-motor unit, and a second electrically controlled valve in series flow relationship with respect to the normal control valve for the purpose of preventing the normal control valve from releasing pressure differential across its pressure responsive element when the electrical control valve is closed under certain control conditions.

Another object of the invention is provision of a new and improved fluid pressure servo-motor of the type having a variable pressure chamber on one side of a pressure responsive movable wall for actuating the same, a first valve means when opened conducts a pressure to said chamber causing the pressure responsive removable wall to assume a deactivated or released condition, a second valve means which when opened conducts a differing pressure to said chamber to actuate said pressure responsive movable wall, a control element for simultaneously operating said first and second valve means, and a normally opened control in series flow relationship with said first valve means which when closed prevents said first valve means from releasing the servo-motor.

Another object of the present invention is the provision of a new and improved servo-motor of the above described type in which the first and second valve means and the electrically controlled valve are mounted directly on the pressure responsive movable wall of the servo-motor unit.

A further object of the invention is the provision of a new and improved braking system for movable devices generally, and which employs a brake applying servo-motor of one of the above mentioned types and in which the electrically controlled valve is caused to be closed by a pair of switches and an electrical supply circuit therefor, one of which switches is closed at speeds of the movable device below a predetermined lever and is opened above said generally predetermined speed, and the other which is closed when the speed control lever of the device's propelling motor is at a setting below a predetermined power output and is opened at settings above said generally predetermined output.

A still further object of the invention is the provision of a new and improved "no creep" braking system for automotive vehicles comprising: a brake applying fluid pressure servo-motor of one of the above mentioned types, and a governor control switch, and an accelerator pedal controlled switch so constructed and arranged that said third valve means will be closed when the accelerator pedal is released and the vehicle is traveling below a generally predetermined speed, and will be opened either when the accelerator pedal is depressed or the speed of the vehicle is above said generally predetermined speed.

A still further object of the invention is the provision of a new and improved "no creep" braking system for automotive vehicles which is simple and rugged in its construction, reliable and efficient in its operation, and is inexpensive to manufacture.

The invention resides in certain constructions, and combinations and arrangements of parts; and further objects and advantages of the invention will become apparent to those skilled in the art to which the invention relates from the following description of the preferred embodiments described with reference to the accompanying drawings forming a part of this specification, and in which;

Figure 1 is a schematic view of an automotive braking system embodying principles of the present invention; and in which the fluid pressure servo-motor driven master cylinder is shown in cross-section.

Figure 2 is a fragmentary cross-sectional view of the servo-motor shown in Figure 1.

Figure 3 is a cross-sectional view of another type of fluid pressure servo-motor embodying principles of the present invention.

Although the principles of the present invention will have utility in other types of fluid pressure servo-motors, and in other types of servo-motor driven systems, it is believed to have particular advantages when used in the type of "no creep" automotive braking system shown in Figure 1.

The servo-motor unit shown in Figure 1 generally comprises a housing A having a fluid pressure chamber therein which is divided into a pair of opposing fluid pressure chambers 10 and 12, respectively, by a pressure responsive movable wall B which is adapted to drive or force a fluid displacement member C into a hydraulic master cylinder D suitably attached to one end wall of the housing A. Operation of the pressure responsive movable wall B is controlled by means of control valve structure E mounted on the movable wall; and which is regulated by means of a control member F that is in turn positioned by means of the brake pedal lever G through the push rod H. The particular servo-motor unit shown is an atmospheric suspended one whose pressure responsive movable wall B is maintained in its de-energized or retracted position, shown in Figure 1, when atmospheric pressure is delivered to both of the opposing chambers 10 and 12; and which is actuated or energized when vacuum from the propelling engine of the vehicle is communicated to the opposing fluid pressure chamber 12.

The pressure responsive movable wall B is formed by means of front and rear die cast sections 14 and 16, respectively, to provide an internal reaction diaphragm chamber 18 which is divided into opposing portions 20 and 22 respectively by a suitable diaphragm 24 whose radially outer edges are clamped between the die-cast sections.

The control valve structure E of the servo-motor structure shown in Figure 1 comprises an atmospheric poppet 26 and a vacuum poppet 28 which are alternately opened and closed to control the pressure in the rear opposing fluid pressure chamber 12. Atmospheric pressure in continually communicated to the front opposing fluid pressure chamber 10 through an air filter 30 and opening 32 in the sidewall of the housing A, which are positioned forwardly of the retracted position of the pressure responsive movable wall. The atmospheric poppet 26 is normally held open to admit atmospheric pressure to the front opposing diaphragm chamber 20, and is thence communicated through the passageway 34 to the rear opposing fluid pressure chamber 12 of the servo-motor. Vacuum from the vehicle's propelling engine is continually communicated to a vacuum chamber 36 formed in the front die-cast section 14 through a vacuum conduit 38 which extends through the sidewalls of the servo-motor housing A and is provided with an intermediate flexible hose section 40 to accommodate axial movement of the movable wall B. The atmospheric and vacuum poppets 26 and 28, respectively, are positioned on opposite sides of the longitudinal axis of the servo-motor, and are constructed and arranged to be opened and closed by movement generally lengthwise of the unit. A vacuum valve port 42 communicates the vacuum chamber 36 with the front opposing diaphragm chamber 20, and is surrounded by a vacuum valve seat 44 which faces rearwardly into the diaphragm chamber 20. The atmospheric valve port 46 extends through an internal wall 48 in the piston portion 14 and is provided with an atmospheric seat 50 facing forwardly of the internal wall 48. The atmospheric valve poppet 26 is positioned forwardly of the atmospheric valve seat 50, and is provided with a stem 52 which extends through the valve port into the front opposing diaphragm chamber 20. The vacuum poppet 28 is positioned in the front opposing diaphragm chamber 20 for abutment with its vacuum valve seat 44, and the two poppets 26 and 28 are connected by a walking beam 54 which is adapted to be actuated at its midpoint in an axial direction by the movable control member F. The movable control member F is a generally cylindrically shaped body which is sliding, sealingly, received in a cylindrical bore 56 located in an axially extending boss 58 which extends forwardly of the front face of the movable wall B. The central portion of the walking beam 54 extends around a reduced diameter section 60 of the control member F which projects into the front opposing diaphragm chamber 20. The center portion of the walking beam is biased up against a shoulder 62 formed by the reduced diameter section 60 by means of abutment member 64 having a pair of forwardly extending projections or knife edges which hold the walking beam 54 into abutment with the shoulder 62 in a manner permitting the walking beam to rock about the knife edges 66. The atmospheric valve poppet 26 is biased closed by a coil spring 68. The vacuum poppet 28 is essentially balanced by a diaphragm 70 on the front end of the vacuum chamber 36, and which diaphragm is connected to the vacuum poppet 28 by a connecting rod 72. Pressure from within the front opposing diaphragm chamber 20 is conducted to the forward face of the diaphragm 70 by means of a suitable passage 74, such that substantially the same differential pressure will be experienced across the diaphragm 70 as is experienced across the vacuum poppet 28. In order to assure positive action of the poppet valve, a leaf spring 76 is used to bias the vacuum poppet to its closed position.

The diaphragm 24 is so constructed and arranged as to produce a reaction or force against the control member F which is generally proportional to the amount of force being developed by the movable wall B—and so appraise the operator of the amount of braking effort that is being produced by the servo-motor at any instant. Atmospheric pressure from the front opposing chamber 10 is continually communicated with the rear opposing diaphragm chamber 22 by a suitable passageway 78, such that the same pressure differential is developed across the diaphragm 24 as is being produced across the pressure responsive movable wall B. A circular plate 80 is affixed to the rear face of the diaphragm 24 in such manner as to divide the diaphragm 24 into radially inner and outer diaphragm portions. A suitable coil spring 82 is positioned against the outer portion of the diaphragm to bias the circular plate 80 up against the rear wall of the diaphragm chamber 18; and the center portion of the diaphragm is biased up into engagement with the control member F by a coil spring 84 positioned between a center button 86 on the diaphragm and the circular plate 80. A small bleed hole 88 is provided in the circular plate 80 to limit the speed at which pressure change can be produced upon the rear face of the center portion of the diaphragm; and the entire diaphragm construction is such as to produce a reaction against the control member F in two stages. During an initial stage of pressure differential build-up across the movable wall B, the circular plate 80 will be held into abutment with the rear wall of the diaphragm chamber by the delayed reaction coil spring 82, such that only the force produced by the differential pressure across the center portion of the diaphragm will be delivered against the control member F. After the pressure differential exceeds a generally predetermined limit, at which the delayed reaction spring 82 begins to yield, the circular plate 80 will move into abutment with the center button 86 of the diaphragm and bias it against the control member F; so that increased pressure differential across the movable wall, thereafter, will cause force from both the inner and outer portions of the diaphragm to be transmitted to the control member.

The structure of the movable wall B is completed by an electrically controlled shut-off valve 90 that is positioned in series with the atmospheric poppet valve 26. The atmospheric shut-off valve 90 is formed by an integrally formed housing 92 in front diecast section 14 which surrounds the atmospheric poppet 26 and generally isolates the atmospheric valve from the front opposing fluid pressure chamber 10. The housing 92 includes a partition 94 spaced forwardly of the atmospheric poppet valve 26 and having a valve port 96 therethrough. The space forwardly of the partition wall 94 is continually in communication with the front opposing fluid pressure chamber 10 by means of suitable openings 98 in the valve housing 92. The electrically controlled shut-off valve 90 is completed by a valve closure member 100 adapted to abut the front face of the partition wall 94 and close off the valve port 96. The valve closure member 100 is actuated by means of an armature 102 that is surrounded by an electrical actuating coil 104 that is housed in a metal sleeve 106 that is pressed into a receiving cylinder 108 formed integrally in the movable wall B forwardly of the partition 94. The valve closure member 94 is normally held open by a coil spring 110 positioned between the actuating coil 104 and a headed end 112 of the armature 102.

Operation of the servo-motor unit A is initiated by depressing of the foot pedal lever G; whereupon the control member F is forced inwardly to close off the atmospheric poppet 26, and thereafter open the vacuum poppet 28. Vacuum from the vehicle's propelling engine is thereby communicated with the front opposing diaphragm chamber 20, and is thence communicated through passageway 34 to the rear opposing fluid pressure chamber 12 to thereby produce a pressure differential across the movable wall B which causes it to force the fluid displacement member rearwardly into the master cylinder D. Fluid displaced in the master cylinder D passes through an outlet passageway 114 through a suitable back pressure valve 116, forming no part of the present invention, to the brake applying wheel cylinders 118 of the vehicle. Up until a predetermined pressure differential is developed across the movable wall B, the circular plate 80 will be held into engagement with the rear wall of the diaphragm chamber 18 by the coil spring 82 to hold off reaction from the outer portion of the diaphragm from being delivered to the control member F. The center portion of the diaphragm 24 is, however, always held against the control member F by the valve return spring 84; such that during this initial stage of pressure development across the movable wall B, only force from the center portion of the diaphragm will be felt by the foot operator. At some predetermined pressure differential, however, the delayed reaction spring 82 yields to permit the circular plate 80 to abut the center button 86 of the diaphragm and thereafter transmit force from the outer portion of the diaphragm to the control member F. The second stage of reaction starts when the above occurs and at approximately the time that the vehicle's brake shoes are brought into engagement with the vehicle's brake drums. The braking application continues so long as the operator forces the control member F into the servo-motor. When the desired braking intensity has been reached, the amount of reaction developed by the diaphragm 24 equals the force being applied to the control member F by the foot of the operator and further inward movement of the control member ceases. Thereupon the vacuum poppet 28 stops moving inwardly to permit the vacuum valve seat 44 carried by the movable wall B to move into engagement with the vacuum poppet, and thereby close off further pressure differential development across the movable wall B. At any time that it is desired to reduce the braking effort being developed by the servo-motor unit, retraction of the foot pedal lever G will cause the atmospheric poppet 26 to move forwardly off of its seat 50, and bleed atmospheric pressure into the rear opposing chamber 12. Reduction in the pressure differential across the movable wall B permits the return spring 120 in conjunction with the pressure forces within the master cylinder D to force the movable wall B forwardly. When sufficient reduction of the braking effort has been achieved and the operator desires to stop its further reduction, further retraction of the control member F is stopped, whereupon the movable wall B moves forwardly relative to the control member F sufficiently to bring the atmospheric poppet 26 into engagement with its valve seat 50; thereafter further change in differential pressure across the movable wall B is prevented and a corresponding pressure is maintained within the master cylinder D. A complete retraction of the foot pedal lever G will, of course, permit the atmospheric poppet 26 to remain open and the movable wall B to move into its retracted position shown in Figure 1 of the drawing.

The "no creep" braking system shown in Figure 1 includes a normally closed governor switch 122 which is adapted to remain closed at vehicle speeds of below approximately 5 miles an hour, and which is adapted to be opened at vehicle speeds of above approximately 5 miles an hour. The system further includes a normally closed accelerator pedal controlled switch which is adapted to be opened whenever the accelerator pedal is moved out of its retracted position to speed up the vehicle's propelling motor. The switches 122 and 124 are arranged in electrical series circuit with respect to the electrical actuating coil 104, which circuit will also include the vehicle's battery 126. The other end of the coil 104 will be grounded as at 128, which grounded connection will complete the electrical circuit through the battery 126 which likewise has a grounded connection 130.

Operation of the "no creep" system above described is such that whenever the vehicle is traveling at a speed below the generally predetermined speed of 5 miles an hour and the accelerator pedal is retracted, as will usually occur when the vehicle is brought to a standstill, the electrical coil 104 will be energized to bias the valve closure member 100 against the partition wall 94 to prevent atmospheric pressure from reaching the atmospheric poppet 26. If the vehicle's brakes have previously been applied, a retraction of the foot pedal lever B which causes the atmospheric poppet 26 to open will not now produce a retraction of the movable wall B nor a reduction in the vehicle's braking effort; inasmuch as atmospheric pressure cannot be communicated with the rear opposing fluid pressure chamber 12. The operator is, therefore, free to lift his foot from the brake pedal lever after the brakes have been applied; and the braking effort previously applied will continue until such time as the accelerator pedal is depressed to open the switch 124, whereupon the coil 104 becomes de-energized and the shut-off valve 90 will be opened by the coil spring 110. This, of course, then permits atmospheric pressure to reach the rear opposing chamber 12, thereby permitting the vehicle's brakes to be released. At any time that the vehicle is moving faster than approximately 5 miles an hour, the governor switch 122 will be opened; such that the coil 104 cannot be energized at speeds above 5 miles per hour; and therefore a retraction of the accelerator pedal will not produce a dragging of the vehicle's brakes.

The embodiment shown in Figure 3 of the drawing generally comprises a servo-motor housing A' having a power chamber therein which is divided into opposing chambers 140 and 142 by a pressure responsive movable wall B' which actuates the fluid displacement member C' to force fluid out of the hydraulic master cylinder D'. Operation of the unit is controlled by means of the control valve structure E' having a hydraulically actuated control member F', which in turn is actuated by means of a brake pedal lever G', which in turn operates a master cylinder 144, which supplies pressure to the backside of the fluid displacement member C' through inter-connecting line 146, and is thence communicated to the backside of the hydraulically actuated control member F' through a suitable passageway 148 in the servo-motor unit.

The control valve structure E' of this embodiment comprises: a double poppet or spool shaped member 150, the rear poppet 152 of which is adapted to abut an atmospheric valve seat 154, and the forward poppet 156 of which is adapted to be abutted by a vacuum valve seat 158 which is carried by a reaction diaphragm 160 separating the vacuum and control chambers 162 and 164, respectively, of the valve structure. The rear atmospheric valve poppet 152 is normally held against its seat by the coil spring 166, and the vacuum valve seat 158 is normally held out of engagement with the forward or vacuum poppet 156 by means of a coil spring 168. The general construction of the servo-motor unit so far described is that shown in the E. J. Ringer Patent No. 2,719,405; and for a more complete understanding of its construction and operation, reference may be had to that patent. Suffice it to say, that a depressing of the foot pedal lever G' forces fluid from the master cylinder 144 through the interconnecting line 146 and passageway 148 to the back side of the hydraulically actuated control member F', which transmits its motion through a stem and spider arrangement 170 to cause the vacuum valve seat 158 to move into engagement with the vacuum valve poppet 156. The servo-motor unit shown in Figure 3 is a narmally vacuum suspended unit in which vacuum is continually supplied to the rear opposing chamber 142 through a suitable vacuum connection 172; and vacuum is conducted through the passageway 148 in the servo-motor unit to the vacuum valve chamber 162. The previously described closure of the vacuum poppet therefore closes off further vacuum communication between the vacuum chamber 162 and the control chamber 164, which is normally communicated with the opposing chamber 140 through an inter-connecting line 176. Additional pressure upon the foot pedal lever G' thereafter causes the hydraulically actuated control member F' to move the rear or atmospheric poppet 152 off of its valve seat 154 to thereby communicate atmospheric pressure to the forward opposing chamber 140. This, of course, produces a pressure differential across the movable wall B', which forces the push rod 178 into the hydraulic cylinder D', and causes its fluid displacement member C' to force fluid into the brake applying wheel cylinder 180 of the automotive vehicle. A build-up in pressure within the control chamber 164 produces a pressure differential across the reaction diaphragm 160 which opposes the actuating force of the hydraulic control member F', and thereby appraises the operator of the amount of braking effort being developed. A retraction of the foot pedal lever G' reduces the hydraulic pressure against the control member F' and permits the reactive force upon the diaphragm 160 to cause the vacuum valve seat 158 to move out of engagement with the vacuum valve poppet 156 and thereby decrease the pressure in the forward opposing chamber 140. This, of course, permits the return spring 182 in conjunction with the hydraulic pressure within the hydraulic master cylinder D' to move the movable wall B' towards its retracted position shown in the drawing. A complete retraction of the foot pedal lever G' would, of course, permit a complete retraction of the movable wall B', and a complete release of the vehicle's brakes.

According to the principles of the present invention, an electrically controlled shut-off valve is provided in this embodiment in the inter-connecting line 176 between the control chamber 164 and the front opposing chamber 140; such that when the valve is energized, it can prevent air pressure within the front opposing chamber 140 from being released.

Although the present embodiment is a vacuum suspended unit which is de-energized when vacuum is communicated to both of its opposing chambers, its principles of operation are quite similar to that of the previously described embodiment; and it will be seen that the electrically controlled shut-off valve 90' is very similar in construction and operation to that described in the previous embodiment. It will be seen that in the present embodiment, however, the shut-off valve 100', is positioned between the actuating chamber of the servo-motor and the control valve 156, which does the releasing of the unit; while in the previous embodiment, the shut-off valve 100 was positioned upstream of its atmospheric poppet 26, which did its releasing of the servomotor unit.

The operation of the "no creep" braking system shown in Figure 3 is very similar to that of the previous embodiment. Suffice it to say that the governor control switch 122' will normally be closed at speeds below approximately 5 miles an hour, and will be opened at speeds above 5 miles an hour; that the accelerator pedal control switch 124' will be closed whenever the accelerator is in its retracted position, and will be opened when it is moved out of this position; and energization of the electrical coil 90' will bias the closure valve 100' against its seat 94'. It will, therefore, be seen that a previously produced energization of the servo-motor A' will be maintained whenever the accelerator pedal is retracted and the vehicle is traveling at a speed of below approximately 5 miles an hour; and that the brakes will be released when the accelerator pedal is depressed. As in the previous embodiment the governor switch 124' will prevent closure of the valve 100' whenever the vehicle is traveling at speeds greater than approximately 5 miles an hour.

While the preferred embodiments of the invention have been described in considerable detail, I do not wish to be limited to the particular constructions shown and described; and it is my intention to cover hereby all novel adaptations, modifications, and arrangements thereof which come within the practice of those skilled in the art to which the invention relates.

I claim:

1. In a fluid pressure servo-motor system for actuating a driven device: a housing having a fluid pressure chamber therein, a pressure responsive movable wall in said chamber dividing said chamber into first and second opposing chambers, first means communicating a first fluid pressure source of a first generally predetermined intensity to said first opposing chamber, second means communicating both said first pressure source and a second pressure source of a second generally predetermined intensity to said second opposing chamber, first valve means in said second means positioned between said first pressure source and said second opposing chamber, second valve means in said second means positioned between said second pressure source and said second opposing chamber, said servo-motor being constructed and arranged to apply force to said driven device when the pressure intensity in said second opposing chamber differs from that of said first pressure chamber, a control member for simultaneously operating said first and second valve means to modulate the pressure in said second opposing chamber, third valve shut-off means in series flow relationship with respect to said first valve means, an armature operatively connected to said third valve means for opening and closing said third valve means, and control means including an electrical coil for actuating said armature whereby said control means under certain control conditions closes said third valve means and prevents said first valve means from releasing said driven device.

2. In a fluid pressure servo-motor system for actuating a driven device: a housing having a fluid pressure chamber therein, a pressure responsive movable wall in said chamber dividing said chamber into first and second opposing chambers, first means communicating a first fluid pressure source of a first generally predetermined intensity to said first opposing chamber, second means communicating both said first pressure source and a second pressure source of a second generally predetermined intensity to said second opposing chamber, first valve means in said second means positioned between said first pressure source and said second opposing chamber, second valve means in said second means positioned between said second pressure source and said second opposing chamber, said servo-motor being constructed and arranged to apply force to said driven device when the pressure intensity in said second opposing chamber differs from that of said first pressure chamber, a control member for simultaneously operating said first and second valve means to modulate the pressure in said second opposing chamber, third valve shut-off means in series flow relationship with respect to said first valve means, an armature operatively connected to said third valve means for opening and closing said third valve means, a spring normally biasing said third valve means open, and an electrical coil for closing said third valve means when said coil is energized.

3. In a fluid pressure servo-motor system for actuating a driven device; a housing having a fluid pressure chamber therein, a pressure responsive movable wall in said chamber dividing said chamber into first and second opposing chambers, first means communicating a first fluid pressure source of a first generally predetermined intensity to said first opposing chamber, second means communicating both said first pressure source and a second pressure source of a second generally predetermined intensity to said second opposing chamber, first valve means in said second means positioned between said first pressure source and said second opposing chamber, second valve means in said second means positioned between said second pressure source and said second opposing chamber, said servo-motor being constructed and arranged to apply force to said driven device when the pressure intensity in said second opposing chamber differs from that of said first pressure chamber, a control member for simultaneously operating said first and second valve means to modulate the pressure in said second opposing chamber, third valve shut-off means in said second means between said first valve means and said second opposing chamber, an armature operatively connected to said third valve means for opening and closing said third valve means, and control means including an electrical coil for actuating said armature, whereby said control means under certain control conditions closes said third valve means and prevents said first valve means from releasing said driven device.

4. In a vacuum energized fluid pressure servo-motor for actuating a driven device; a housing having a fluid pressure chamber therein, a pressure responsive movable wall in said chamber dividing said chamber into first and second opposing chambers, first means communicating a vacuum source to said first opposing chamber, second means for communicating both vacuum and atmospheric pressure to said second opposing chamber, first valve means in said second means positioned between said vacuum source and said second opposing chamber, second valve means in said second means positioned between the atmosphere and said second opposing chamber, said servo-motor being constructed and arranged to apply force to said driven device when atmospheric pressure is bled into said second opposing chamber, a control member for simultaneously operating said first and second valve means to modulate the pressure in said second opposing chamber, third valve shut-off means in said second means between said first and second valve means and said second opposing chamber, an armature operatively connected to said third valve means for opening and closing said third valve means, and control means including an electrical coil for actuating said armature, whereby said control means under certain control conditions closes said third valve means and prevents said first valve means from releasing said driven device.

5. In a vacuum energized fluid pressure servo-motor for actuating a driven device; a housing having a fluid pressure chamber therein, a pressure responsive movable wall in said chamber dividing said chamber into first and second opposing chambers, first means communicating a vacuum source to said first opposing chamber, second means for communicating both vacuum and atmospheric pressure to said second opposing chamber, first valve means in said second means positioned between said vacuum source and said second opposing chamber, second valve means in said second means positioned between the atmosphere and said second opposing chamber, said servo-motor being constructed and arranged to apply force to said driven device when atmospheric pressure is bled into said second opposing chamber, a control member for simultaneously operating said first and second valve means to modulate the pressure in said second opposing chamber, third valve shut-off means in said second means between said first and second valve means and said second opposing chamber, an armature operatively connected to said third valve means for opening and closing said third valve means, a spring normally biasing said third valve means open, and an electrical coil for closing said third valve means when said coil is energized.

6. In a fluid pressure servo-motor for actuating a driven device; a housing having a fluid pressure chamber therein, a pressure responsive movable wall in said chamber dividing said chamber into first and second opposing chambers, first means communicating a first fluid pressure source of a first generally predetermined intensity to said first opposing chamber, second means in said pressure responsive movable wall for communicating both said first pressure source and a second pressure source of a second generally predetermined intensity to said second opposing chamber, first valve means in said second means positioned between said first pressure source and said second opposing chamber, second valve means in said second means positioned between said second pressure source and said second opposing chamber, said servo-motor being constructed and arranged to apply force to said driven device when the pressure intensity in said second opposing chamber differs from that of said first source, a control member on said pressure responsive movable wall for simultaneously operating said first and second valve means to modulate the pressure in said second opposing chamber, third valve shut-off means carried by said pressure responsive movable wall in series flow relationship with respect to said first valve means, an armature carried by said pressure responsive movable wall and operatively connected to said third valve means for opening and closing said third valve means, and control means including an electrical coil for actuating said armature, whereby said control means under certain control conditions closes said third valve means and prevents said first valve means from releasing said driven device.

7. In an automotive vehicle having an accelerator lever having a normal position out of which it is moved to accelerate the vehicle, a first switch that is in a first condition when said accelerator lever is in its normal position and is moved to a second condition when said accelerator lever is moved out of its normal position, a speed responsive governor switch that is in a first condition at vehicle speeds below a predeteremined speed and is in a second condition at vehicle speeds above said predetermined speed, and a brake for stopping the vehicle: a fluid pressure motor having a housing with a fluid pressure chamber therein, a pressure responsive movable wall in said chamber dividing said chamber into first and second opposing chambers and constructed and arranged to actuate said brake, first means communicating a first fluid pressure source of a first generally predetermined intensity to said first opposing chamber, second means for communicating both said first pressure source and a second pressure source of a second generally predetermined intensity to said second opposing chamber, first valve means in said second means positioned between said first pressure source and said second opposing chamber, second valve means in said second means positioned between said second pressure source and said second opposing chamber, said motor being constructed and arranged to apply force to said brake when the pressure intensity in said second opposing chamber differs from that in said first opposing chamber, a control member for simuletaneously operating said first and second valve means to modulate the pressure in said second opposing chamber, and a solenoid valve shut-off means in series flow relationship with respect to said first valve means, the solenoid of which is in electrical series circuit with said first and governor switches and which causes said valve to be closed when said switches are in their first conditions and which causes said valves to be open when at least one of said switches are in their second conditions.

8. In an automotive vehicle having an accelerator lever having a normal position out of which it is moved to accelerate the vehicle, a first switch that is in a closed condition when said accelerator lever is in its normal position and is moved to an open condition when said accelerator lever is moved out of its normal position, a speed responsive governor switch that is in a closed condition at vehicle speeds below a predetermined speed and is in an open condition at vehicle speeds above said predetermined speed, and a brake for stopping the vehicle: a fluid pressure servo-motor having a housing with a fluid pressure chamber therein, a pressure responsive movable wall in said chamber dividing said chamber into first and second opposing chambers and constructed and arranged to actuate said brake, first means communicating atmospheric pressure to said first opposing chamber, second means for communicating both atmospheric pressure and a source of vacuum to said second opposing chamber, first valve means in said second means positioned between said atmospheric pressure and said second opposing chamber, second valve means in said second means positioned between said source of vacuum and said second opposing chamber, said servo-motor being constructed and arranged to apply force to said brake when vacuum is admitted to said second opposing chamber, a control member for simultaneously operating said first and second valve means to modulate the pressure in said second opposing chamber, and a solenoid valve shut-off means in series flow relationship with respect to said first valve means, the solenoid of which is in electrical series circuit with said first and governor switches and which causes said valve to be closed when said switches are closed and which causes said valve to be open when at least one of said switches are opened.

References Cited in the file of this patent

UNITED STATES PATENTS

| | | |
|---|---|---|
| 2,301,576 | Parsons et al. | Nov. 10, 1942 |
| 2,457,721 | Price | Dec. 28, 1948 |
| 2,607,321 | Lado | Aug. 19, 1952 |
| 2,623,502 | Lisle | Dec. 30, 1952 |
| 2,669,329 | Price | Feb. 16, 1954 |
| 2,698,605 | Kress | Jan. 4, 1955 |